Aug. 25, 1953   G. E. SMITH   2,649,782
CYLINDER BORE TAPER GAUGE
Filed Sept. 19, 1951

Inventor
Gaylord E. Smith
By Frank E. Liverance, Jr.
Attorney

Patented Aug. 25, 1953

2,649,782

UNITED STATES PATENT OFFICE 2,649,782

CYLINDER BORE TAPER GAUGE

Gaylord E. Smith, Muskegon, Mich., assignor to Muskegon Piston Ring Company, Muskegon, Mich., a company of Michigan Application September 19, 1951, Serial No. 247,250

4 Claims. (Cl. 33—164)

1

The present invention is concerned with a novel, simple, accurate and easily operated cylinder bore taper gauge, which may be economically die cast manufactured and with which the enlargement at the upper end of a cylinder in an internal combustion engine after the engine has been operated, may be measured when reconditioning the engine, after long use.

When internal combustion engines have operated for a considerable time, the cylinders become of a greater diameter at their upper than at their lower ends or slightly below the extreme upper ends of the cylinders or may wear to an oval shape. Such increase or change in diameter is known as the taper of the cylinder. The measuring of this taper by means of calipers or other instruments may be inaccurate or uncertain. Such taper or out-of-round is accurately obtained, in a very simple manner, by means of the instrument I have invented, which is quickly and readily operated without the operator necessarily being especially skilled.

It is an object and purpose of the present invention to provide a cylinder bore taper gauge of the character stated by means of which the taper or ovality in a cylinder of an internal combustion engine is easily and accurately measured, and to produce a cylinder bore taper gauge of a practical and novel structure which is economical to manufacture so that it may be sold at relatively low cost.

Figure 1:
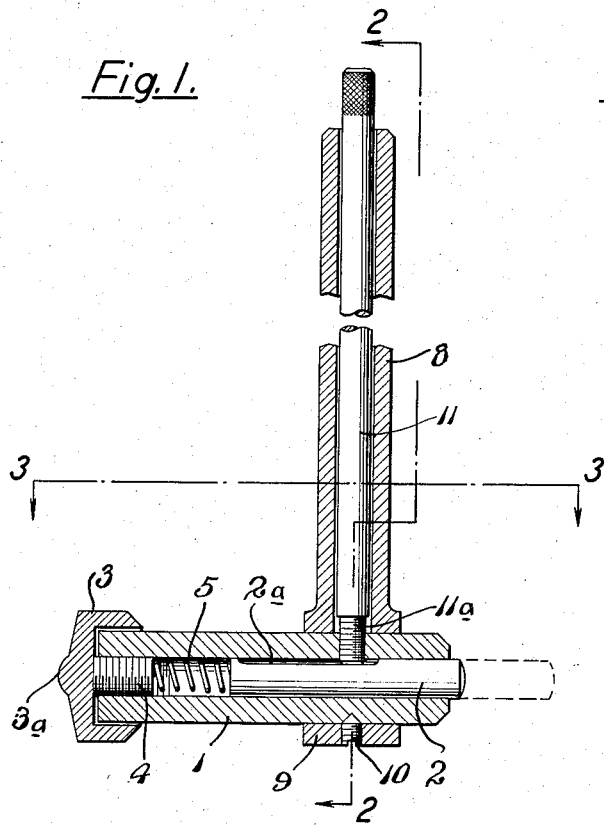

An understanding of the invention may be had from the following description, taken in connection with the accompanying drawing, in which, Fig. 1 is a central vertical section through the taper gauge constructed in accordance with my invention.

Figure 2:
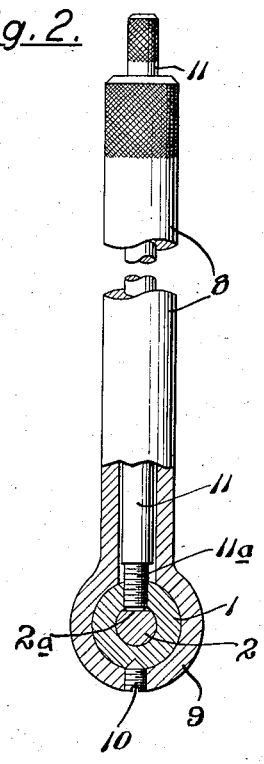
Figure 3:
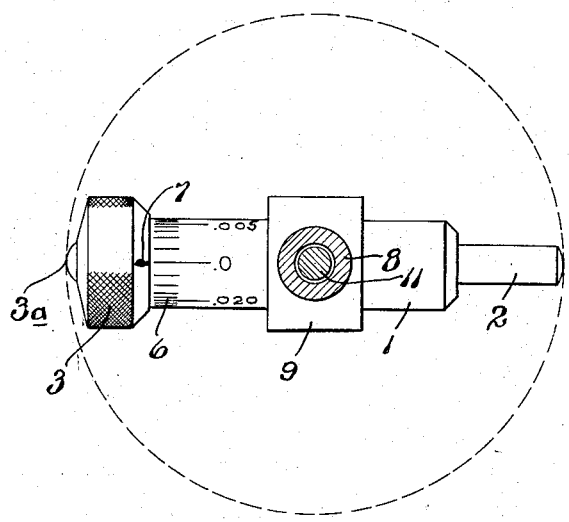

Fig. 2 is a partial elevation and vertical section upon the plane of line 2—2 of Fig. 1, looking in the direction indicated, and Fig. 3 is a partial horizontal section and plan view, the section being upon the plane of line 3—3 of Fig. 1.

Like reference characters refer to like parts in the different figures of the drawing.

In the structure shown, a sleeve 1 has, in the axial opening therethrough, a rod 2 mounted for longitudinal movement therein. Said rod 2 at its upper side for a part of its length is flattened or grooved as indicated in 2a, from closely adjacent the inner end of the rod toward but short of the opposite outer end thereof. The outer end of the rod, preferably, is rounded as shown.

2

At the other end of the sleeve 1, a cap 3 is located which has flanges surrounding the adjacent end of the sleeve 1. It is provided with an exteriorly threaded centrally located stud 4 which screws into the adjacent end of the sleeve 1. The cap at its outer side is formed with a rounded projection 3a, aligned axially with the rounded outer end of the rod 2. Between the inner end of the stud 4 and the adjacent inner end of the rod 2 a coiled compression spring 5 is located within the sleeve 1. Such spring under compression tends to move the rod 2 outwardly, as from its full line to its dash line position shown in Fig. 1 when the rod 2 is free for such movement.

At the end portion of the sleeve 1 where the cap 3 is located a graduated scale 6 is made around the sleeve, and upon the annular flange of the cap 3 an indicator pointer 7 is provided which, as the cap is turned moves successively from one of the indicating lines of the scale 6 to the next adjacent line.

An elongated vertical sleeve 8 is provided at its lower end with a collar 9 having an interior diameter such that the sleeve 1 passes therethrough. The collar is secured in fixed relation to the sleeve 1 by the set screw 10 passing through the collar and engaging with the sleeve 1.

An elongated rod 11 is inserted downwardly through the vertical sleeve 8. At its lower end it is reduced in diameter and exteriorly threaded at 11a, and screw threaded through the wall of the sleeve 1 so that, at its inner end, it may be brought to bear against the rod 2 at the flat portion 2a thereof. When in tight bearing engagement thereagainst, rod 2 is held against movement. When the rod 11 is turned to release it, rod 2 is subject to the force of the spring 5 so that it will move outwardly upon such compressed spring being released. The upper end of the rod 11 is preferably knurled as shown so that it may be readily grasped for manual operation.

In the use of the gauge, the rod 2 is pushed into the sleeve 1 so that the distance between the projection 3a and the outer end of the rod is less than the diameter of a cylinder, the taper of which is to be measured. The gauge is then inserted into the cylinder, moving downwardly therein from its upper end until desired lower position is reached, whereupon the rod 11 is unscrewed to release the gauge rod 2. Rod 2 under the action of the spring 5 will move outwardly, as indicated in dash lines in Fig. 1, until diametrically opposite sides of the cylinder are engaged by the projection 3a and the outer end of the rod 2 as shown in Fig. 3, the wall of the cylinder being indicated in the dash line circle. With the parts in such position, rod 11 is then tightened against the flattened portion of the rod 2 and the gauge lifted to the upper end portion of the cylinder. Before the gauge is first entered into the cylinder, the pointer 7 is to be adjusted so that it is at the zero marking of the scale 6. After the gauge has been lifted to the upper end portion of the cylinder, the cap 3 is turned to unscrew from the stud 4 until, at the larger diameter of the upper end of the cylinder, the projection 3a and the outer end of the rod 2 again contact the cylinder wall at diametrically opposed points.

In turning the cap 3, the pointer 7 will move away from the zero indication of a greater or less distance in accordance with whether the taper is small or large, but in any case, when the gauge has been adjusted so that, at the larger diameter end of the cylinder, projection 3a and the outer end of the rod 2 engage the cylinder, by reading the scale 6 and the distance that the pointer 7 has moved away from its initial zero position, the diameter of the enlarged upper end of the cylinder over that of the cylinder at its lower end is at once apparent. The lines of scale 6 are properly spaced so that each space between successive lines will indicate one thousandth of an inch, or fractions thereof though of course, such measurement indication may be varied.

It is apparent from the foregoing description that the gauge described is of a practical and a particularly simple, economical structure, and with it the measurement of the taper enlargement of a cylinder at its outer end over that at its inner end is quickly and accurately obtained. The structure is also of a sturdy type, not readily subject to damage and is one which does not get out of order or require frequent repair or reconditioning.

The invention is defined in the appended claims and is to be considered comprehensive of all forms of structure coming within their scope.

I claim:

1. A gauge comprising, a horizontal sleeve, a rod telescopically received in said sleeve at one end thereof, a cap having an annular flange around the opposite end portion of the sleeve, a threaded stud connected with the cap screwed into said opposite end of the sleeve, a coiled compression spring in the sleeve between adjacent ends of the stud and rod, an elongated vertical tube, a collar at the lower end of the tube located around and secured to the horizontal sleeve between its ends, and a second rod located lengthwise of the tube, at its upper end extending thereabove and threaded at its lower end through said horizontal sleeve having its lower end adapted to bind against the first rod, or be released therefrom, said sleeve adjacent the cap flange having a spaced line scale around it, and the cap flange having a pointer thereon in association with the scale.

2. A gauge comprising, a horizontal sleeve, a rod telescopically received in one end of the sleeve, a cap having an annular flange around the opposite end portion of the sleeve, a threaded stud connected with the cap screwed into said opposite end of the sleeve, a coiled compression spring in the sleeve between the adjacent ends of the stud and sleeve, a vertical tube secured at its lower end to the sleeve between its ends, and a second rod located lengthwise of the tube threaded through the sleeve at its lower end, said sleeve and cap flange having a cooperating scale and pointer, as described.

3. A gauge comprising, a horizontal sleeve, a rod telescopically received in one end of the sleeve, a stud threaded into the opposite end of the sleeve, said stud having a head at its outer end, a yielding compression spring between the adjacent ends of the stud and rod, a vertical tube secured at its lower end to the sleeve between its ends, a second rod extending lengthwise of the tube and threaded through the sleeve to clamp or release said rod in the sleeve, said sleeve and head having a cooperating scale and pointer.

4. A gauge comprising, a horizontal sleeve open at both ends, a rod telescopically received in one end of the sleeve, a manually operable stud threaded into the opposite end of the sleeve, a yielding compression spring between the ends of the stud and rod and a second rod located at right angles to said sleeve having a threaded end portion passing through a side of said sleeve adapted to be manually turned to clamp or release said rod in the sleeve on turning said second rod in opposite directions, said manually operable screw threaded stud being adapted to carry a pointer to cooperate with a scale on said sleeve.

GAYLORD E. SMITH.

References Cited in the file of this patent

UNITED STATES PATENTS

| Number | Name | Date |
|---|---|---|
| 2,344,878 | Jarosz | Mar. 21, 1944 |
| 2,496,655 | Balk | Feb. 7, 1950 |
| 2,523,469 | Hubeck | Sept. 26, 1950 |